(12) United States Patent
Cook et al.

(10) Patent No.: US 6,965,574 B1
(45) Date of Patent: Nov. 15, 2005

(54) NETWORK TRAFFIC DATA COLLECTION AND QUERY

(75) Inventors: Christopher L. Cook, Seattle, WA (US); Gretta E. Bartels, Seattle, WA (US)

(73) Assignee: Arbor Networks, Inc., Lexington, MA (US)

(*) Notice: Subject to any disclaimer, the term of this patent is extended or adjusted under 35 U.S.C. 154(b) by 904 days.

(21) Appl. No.: 09/886,352

(22) Filed: Jun. 20, 2001

(51) Int. Cl.[7] .............................................. H04L 12/26
(52) U.S. Cl. ......................................... 370/252; 707/3
(58) Field of Search .............................. 370/241, 252, 370/253; 707/3, 4

(56) References Cited

U.S. PATENT DOCUMENTS

| | | | | |
|---|---|---|---|---|
| 5,703,939 A | * | 12/1997 | Bushnell ................. | 379/112.05 |
| 6,286,052 B1 | * | 9/2001 | McCloghrie et al. ....... | 709/238 |
| 6,801,503 B1 | * | 10/2004 | Wetherall et al. ........... | 370/235 |
| 2002/0032774 A1 | * | 3/2002 | Kohler et al. ................ | 709/225 |
| 2002/0069200 A1 | * | 6/2002 | Cooper et al. .................. | 707/9 |

OTHER PUBLICATIONS

ANONYMOUS: Net Flow Flow Analyzer Overview, Chapter 1, Publication date unknown, 6 pages.
ANONYMOUS: Using the Net Flow Flow Analyzer Display, Chapter 3, Publication date unknown, 5 pages.

* cited by examiner

Primary Examiner—Melvin Marcelo
(74) Attorney, Agent, or Firm—Houston Eliseeva LLP

(57) ABSTRACT

An apparatus is equipped to receive descriptive data for network traffic. In one embodiment, the apparatus is equipped to conditionally modify timing data of the network traffic to conform the timing data to the timing patterns of previously network traffic, when determined that the timing data of the network traffic are aberrations. Further, the apparatus is equipped with a query facility that supports a network oriented query language. The language includes specific network oriented language elements.

40 Claims, 15 Drawing Sheets

Header (32 bytes): 302

| Original flow data type | Number of entries |
|---|---|
| Router uptime (ms) ||
| Unixsecs on router ||
| Unixsecs on sensor ||
| Flow sequence counter ||

| Engine type | Engine ID | Unix millisecs on router |
|---|---|---|
| Agg method | Agg version | Sampling interval |

Sender addr (in host order)

Entry (52 bytes): 304

| Source addr (in host order) ||
|---|---|
| Dest addr (in host order) ||
| Next hop addr (in host order) ||
| In interface | Out interface |
| Packets ||
| Bytes ||
| Flow start time ||
| Flow end time ||
| Source port | Dest port |

| Padding | TCP flags | IP protocol | TOS |
|---|---|---|---|

| Source AS | Dest AS |
|---|---|
| Src net len | Dst net len | Padding |

Flows

Figure 3

File header (16 bytes): 402
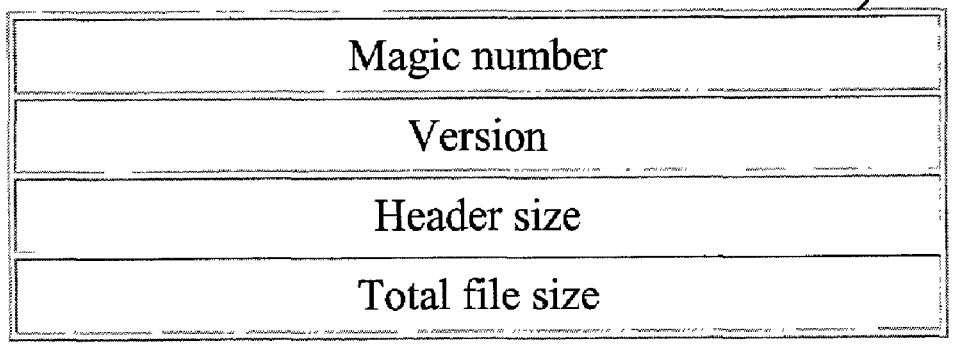
Data Header (28 bytes): 404
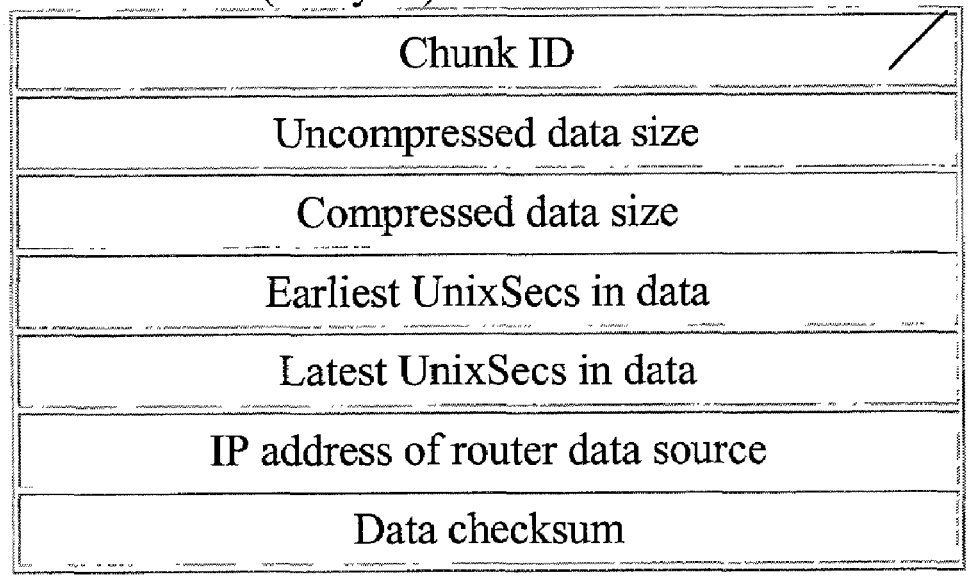
Figure 4

Network Traffic Data Collection and Analysis

Enter Query Command: 522

| MQ hist protocol | ~ 524

Figure 5c

Network Traffic Data Collection and Analysis

Enter Advanced Query: 532

| Mquery { If (SourceAddr & 255.255.0.0) = 10.0.0.0 {Print "Found"} } | ~ 534

Figure 5d

// Copyright (c) 2000-2001 Asta Networks. All rights reserved.

```
#ifndef __MARIO_QUERIES_HH__
define __MARIO_QUERIES_HH__ enum QueryVersions
{
  MARIO_MAJOR_QUERY_VERSION   = 4,
  MARIO_MINOR_QUERY_VERSION   = 2,
  MARIO_QUERY_VERSION = ((MARIO_MAJOR_QUERY_VERSION
<< 4) + MARIO_MINOR_QUERY_VERSION)
};

enum Commands
{
  CMD_PRINT_SYSTEMVALUE  = 1,
  CMD_PRINT_NUMBER       = 2,
  CMD_PRINT_STRING       = 3,
  CMD_PRINT_NEWLINE      = 4,
  CMD_PRINT_HIST         = 5,
  CMD_PRINT_HIST_KEYS    = 6,
  CMD_SET_VAR            = 7,

CMD_IF                 = 8,
  CMD_IF_ELSE            = 9,

WITH_FIRST_PACKET      = 10,
  WITH_LAST_PACKET       = 11,

FOR_EACH_PACKET        = 12,
  FOR_EACH_FLOW          = 13,

CMD_DEF_HIST           = 14,
  CMD_ADD_TO_HIST        = 15,
```

Figure 10a

```
CMD_INCR_VAR        = 17,
CMD_INCR_VAR_BY     = 18,

CMD_INCR_LVAR       = 19,
CMD_INCR_LVAR_BY    = 20,
CMD_PRINT_LVAR      = 21,

CMD_DEF_ARRAY           = 22,
CMD_ADD_TO_ARRAY        = 23,
CMD_PRINT_ARRAY         = 24,
CMD_PRINT_ARRAY_BY_PKT  = 25,
CMD_PRINT_ARRAY_BY_FLOW = 26
};

enum NumericValues
{
  CONSTANT_BYTE_VALUE = 0x80,
  CONSTANT_INT_VALUE  = 0x81,
  HEADER_VALUE        = 0x82,
  FLOW_VALUE          = 0x83,
  SYSTEM_VALUE        = 0x84,
  VAR_VALUE           = 0x85,
  TCPFLAGS_VALUE      = 0x86
};

enum HeaderValues
{
  HV_ORIGTYPE    = 0, // Original flow data type
  HV_COUNT       = 1, // The number of records
  HV_ROUTERUPTIME = 2, // Time in millisecs since router booted
  HV_ROUTERSECS  = 3, // Seconds since 0000 UTC 1970 on router
  HV_SENSORSECS  = 4, // Seconds since 0000 UTC 1970 on sensor
  HV_SEQNUM      = 5, // Seq counter of total flows seen
  HV_ENGINETYPE  = 6, // Type of interface generating the flows
  HV_ENGINEID    = 7, // ID of interface generating the flows
  HV_ROUTERMSECS = 8, // Unix millisecs on router
  HV_AGGMETHOD   = 9, // Aggregation method (for NetFlow v8+)
```

Figure 10b

```
  HV_AGGVERSION  = 10, // Aggregation version (for NetFlow v8+)
  HV_SAMPINTERVAL = 11, // Sampling interval
  HV_SENDERADDR  = 12  // IP address where this data came from
};

enum FlowValues
{
  FV_SRCADDR  = 0,  // IP address of source
  FV_DSTADDR  = 1,  // IP address of destination
  FV_NEXTHOP  = 2,  // IP address of next-hop router
  FV_IN_IF    = 3,  // ID of incoming interface
  FV_OUT_IF   = 4,  // ID of outgoing interface
  FV_NUMPKTS  = 5,  // Number of packets in the flow
  FV_NUMBYTES = 6,  // Number of bytes in the flow
  FV_FIRST    = 7,  // On routerUptime scale, when flow started
  FV_LAST     = 8,  // On routerUptime scale, when flow ended
  FV_SRCPORT  = 9,  // Layer 4 source port
  FV_DSTPORT  = 10, // Layer 4 destination port
  FV_PAD8     = 11, // UNUSED
  FV_TCPFLAGS = 12, // Or of all flags seen in flow, or ACK
  FV_PROTOCOL = 13, // Layer 3 protocol
  FV_TOS      = 14, // Type of service
  FV_SRC_AS   = 15, // Source autonomous system
  FV_DST_AS   = 16, // Destination autonomous system
  FV_SRC_MASK = 17, // Number of valid src addr bits for netmask
  FV_DST_MASK = 18, // Number of valid dst addr bits for netmask
  FV_PAD16    = 19, // UNUSED
  FV_FLOWS    = 20  // Number of flows (when aggregated)
};

enum Operators
{
  OP_LGC_NOT      = 0xc0,
  OP_LGC_AND      = 0xc1,
  OP_LGC_OR       = 0xc2,
```

Figure 10c

```
OP_BIT_NOT        = 0xc3,
OP_BIT_AND        = 0xc4,
OP_BIT_OR         = 0xc5,
OP_BIT_XOR        = 0xc6,

OP_EQ       = 0xc7,
OP_NE       = 0xc8,
OP_GT       = 0xc9,
OP_GE       = 0xca,
OP_LT       = 0xcb,
OP_LE       = 0xcc, OP_ADD      = 0xcd,
OP_SUB      = 0xce,
OP_MUL      = 0xcf,
OP_DIV      = 0xd0,
OP_MOD      = 0xd1,
OP_TRN      = 0xd2, OP_LVAR_MUL_DIV = 0xd3, OP_MUL_DIV_32 = 0xd4
};

enum PrintTypes
{
  PT_UINT      = 0,
  PT_INT       = 1,
  PT_IPADDR    = 2,
  PT_8BITS     = 3,
  PT_HEX       = 4,
  PT_PROTOCOL  = 5,
  PT_TCPFLAGS  = 6,
  PT_TM_MSECS  = 7,
  PT_TM_SECS   = 8,
```

Figure 10d

```
PT_CUINT    = 9,
PT_CINT     = 10,
PT_HEXBYTE  = 11,
PT_HEXWORD  = 12,
PT_BOOL     = 13,
PT_SAMPINT  = 14,
PT_HEXDWORD = PT_HEX
};

enum HistogramValueTypes
{
    HIST_SUM    = 0x71,
    HIST_OR     = 0x72,
    HIST_MAX    = 0x73,
    HIST_MIN    = 0x74,
    HIST_FIRST  = 0x75,
    HIST_LAST   = 0x76,
    HIST_UNIQUE = 0x77
};

enum SystemValues
{
    SYSVAL_VERSION_STRING  = 0,
    SYSVAL_CURRENT_TIME    = 1,
    SYSVAL_DATA_PRESENT    = 2
};

#endif // __MARIO_QUERIES_HH__
```

Figure 10e

NETWORK TRAFFIC DATA COLLECTION AND QUERY

BACKGROUND OF THE INVENTION

1. Field of the Invention

The present invention relates to the field of networking. More specifically, the present invention relates to the collection of network traffic data, and the selective analysis of the collected data.

2. Background Information

With advances in integrated circuit, microprocessor, networking and communication technologies, increasing numbers of devices, in particular, digital computing devices, are being networked together. Devices are often first coupled to a local area network, such as an Ethernet based office/home network. In turn, the local area networks are interconnected together through wide area networks, such as SONET networks, ATM networks, Frame Relays, and the like. Of particular importance is the TCP/IP based global internetworks, Internet.

As a result this trend of increased connectivity, increasing numbers, of applications that are network dependent are being deployed. Examples of these network dependent applications include but are not limited to, email, net based telephony, world wide web and various types of e-commerce. For these applications, success inherently means high volume of network traffic for their implementing servers. To ensure continuing success, quality of service through orderly and efficient handling of the large volume of network traffic has become of paramount importance. Various subject mailers, such as scalability, distributive deployment and caching of contents as well as preventing network misuse have become of great interest to the artisan.

Many of these subject matters rely on the collection and analysis of network traffic data. A number of prior art tools are available to perform such data collection and analyses. An example of such prior art tool is the NetFlow Collector and Analyzer available from CISCO, Inc. of San Jose, Calif. These early generation data collection and analysis tools all suffer from at least a common deficiency in that they lack a flexible and versatile query facility that allows a wide variety of interrogatories to be made against a collection of network traffic data, to facilitate in-depth analysis of the network traffic. Such in-depth analyses are increasingly needed to understand and manage the performance of today and future complex networks.

Thus, a more flexible and versatile methodology is desired.

SUMMARY OF THE INVENTION

An apparatus is equipped to receive descriptive data for network traffic. In one embodiment, the apparatus is equipped to conditionally modify timing data of the network traffic to conform the timing data to the timing patterns of previously deleted network traffic, when it is determined that the timing data of the network traffic are aberrations. Further, the apparatus is equipped with a query facility that supports a network oriented query language. The language includes specific network oriented language elements.

In one embodiment, the language elements include
a) command options for specifying a query to be run for a plurality of time bins;
b) commands for specifying processing to be performed for each network traffic flow;
c) commands for specifying processing to be performed for a first, a last or each packet; and
d) predetermined network oriented keywords for specifying network traffic attributes.

BRIEF DESCRIPTION OF DRAWINGS

The present invention will be described by way of exemplary embodiments, but not limitations, illustrated in the accompanying drawings in which like references denote similar elements, and in which:

FIG. 3 illustrates a data format for storing the collected network traffic data in temporary storage, in accordance with one embodiment;

FIG. 4 illustrates a data format for storing the collected network traffic data in persistent storage, in accordance with one embodiment;

FIGS. 5c–5d illustrate two panes of the end user interface of the query facility of the present invention, in accordance with one embodiment;

FIGS. 10a–10e illustrate one example implementation of the byte code generation.

| GLOSSARY | |
| --- | --- |
| ATM | Asynchronous Transfer Mode |
| AS | Autonomous System |
| DNS | Domain Name Service |
| DSCP | Differentiated Services Code Point |
| IP | Internet Protocol |
| SONET | Synchronous Optical Network |
| TCP | Transmission Control Protocol |
| TOS | Type of Service |
| UDP | User Datagram Protocol |
| Unixsecs | Time in seconds |

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a processor based device, using terms such as receiving, analyzing, determining, generating, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical and electrical components of the processor based device; and the term processor include microprocessors, micro-controllers, digital signal processors, and the like, that are standalone, adjunct or embedded.

Various operations will be described as multiple discrete steps in turn, in a manner that is most helpful in understanding the present invention, however, the order of description should not be construed as to imply that these operations are necessarily order dependent. The terms "routing devices" and "route" are used throughout this application, in the claims as well as in the specification. The terms as used herein are intended to be genus terms that include the conventional routers and conventional routing, as well as all other variations of network trafficking, such as, switches or switching, gateways, hubs and the like. In particular, these operations need not be performed in the order of presentation. Further, the description repeatedly uses the phrase "in one embodiment", which ordinarily does not refer to the same embodiment, although it may.

Overview

Figure 1:
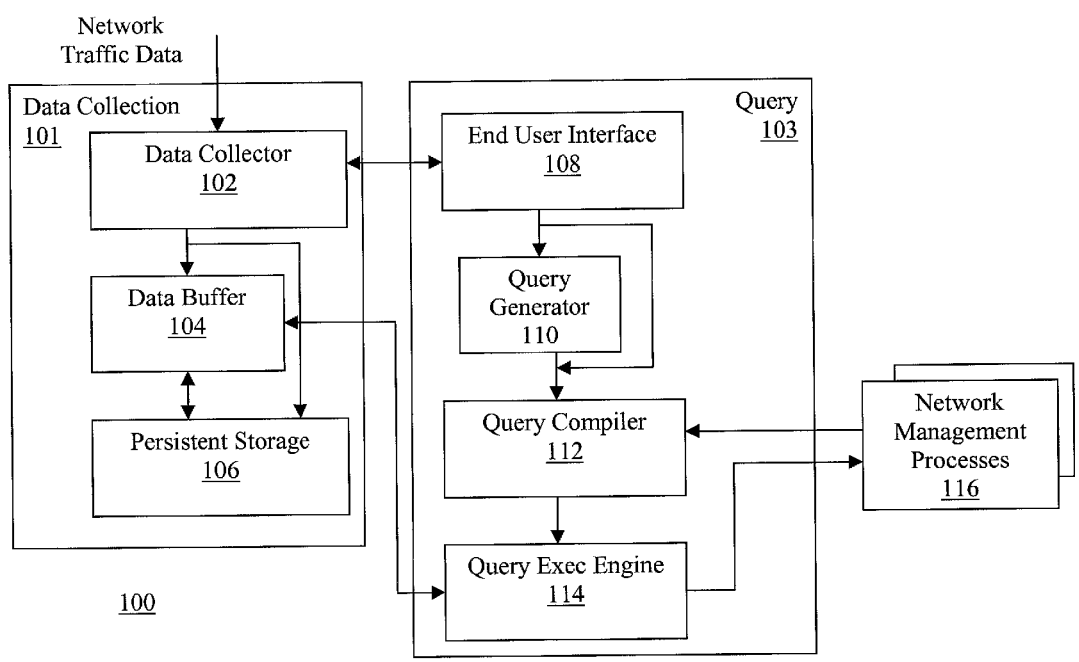
FIG. 1 illustrates an overview of the present invention, in accordance with one embodiment.

Referring now to FIG. 1, wherein a block diagram illustrating an overview of the present invention, in accordance with one embodiment, is shown. As illustrated, the present invention includes network traffic data collection facility 101 and network traffic data query facility 103. Network traffic data collection facility 101 includes network traffic data collector 102, associated temporary data storage buffer 104, and associated persistent data storage 106. Network traffic data query facility 103 includes end user interface 108, query generator 110, query compiler 112 and query execution engine 114. The elements are operationally coupled to each other as shown.

Data collector 102 is provided to facilitate collection of descriptive data associated with network traffic of interest. As will be described in more detail below, data collector 102 advantageously includes "auto timing correction" for the descriptive data being collected. That is, data collector 102 detects timing "aberrations", and automatically corrects timing data that are deemed to be "aberrations". Timing "aberration" refers to the phenomenon where a significant difference exists between a routing device and its "monitoring" sensing device on the perception of time, and/or the timing data for network traffic between two nodes exhibits a temporal or sudden substantial difference from timing patterns of early network traffics between the same two nodes or two nodes of the same communities. Such timing "aberrations" are known to exist between routing devices and their "monitoring" sensing devices, as well as known to occur from time to time for network traffic packets routed on a "best effort" basis (such as, network traffic packets routed over the Internet).

In one embodiment, the descriptive data are collected for network traffic flows. A network traffic flow comprises source address, destination address, source port, destination port, Layer 3 protocol, TOS byte (DSCP), and identification of the ingress interface.

Temporal data buffer 104 and persistent storage 106 are provided to store the collected network traffic data. The network traffic data are typically first stored in temporal data buffer 104 before being stored into persistent storage 106. However, in the presently preferred embodiments, direct storage into persistent storage 106 is also provided. Further, network traffic data stored in persistent storage 106 may be reloaded into temporal data buffer 104 for processing. In alternate embodiments, queries may be run directly against network traffic data stored in persistent storage 106, without first explicitly reloading them back into temporal data buffer 104. In one embodiment, temporal data buffer 104 is a circular buffer disposed in system memory of the "host" system "hosting" data collector 102, and persistent storage 106 is disposed on a mass storage device, such as a disk drive, of the "host" system (not shown) of data collector 102. In alternate embodiments, persistent storage 106 may be disposed on a distributed storage device, such as network storage, accessible from the "host" system.

End user interface 108, as will be described in more detail below, is provided to facilitate a user in submitting "high level" (abstracted) query commands against the collected network traffic data. These query commands result in queries formed using language elements of the network oriented query language of the present invention, to be run against the collected network traffic data. In one embodiment, end user interface 108 also includes features that allow an administrator having the proper authority to configure data collection facility 101 and query facility 103. In alternate embodiments, separate interfaces may be used for the administration functions instead.

Query generator 110, as will be described in more detail below, is provided to process the "high level" (abstracted) query commands, and in response, "generates" the appropriate query or queries formed with language elements of the network oriented query language of the present invention.

Query compiler 112, as will be described in more detail below, is provided to "compile" queries formed using language elements of the network oriented query language of the present invention, into byte codes for execution under the control of query execution engine 114. Query execution engine 114, as will be described in more detail below, control execution of the byte codes as well as performs conventional execution runtime services, such as memory allocation request and release, error/exception handling, and so forth.

For the illustrated embodiment, query compiler 112 includes an application programming interface (API) (not shown), through which queries formed using language elements of the network oriented query language of the present invention, may be programmatically submitted by other processes, such as network management processes 116, for compilation, and in turn execution by engine 114. Management processes 116 may be co-resident with query facility 103 on the same "host" system (not shown) of query facility 103 or remotely disposed away the "host" system, and communicate with query facility 103 using conventional cross system communication techniques. In alternate embodiments, the various components of query facility 103, i.e. end user interface 108, query generator 110, and so forth, may be co-resident on the same "host" system, or distributedly disposed. Again, the distributedly disposed components may communicate with each other using conventional cross system communication techniques.

The relevant aspects of the various elements, including the manner they cooperate with one another will be described in turn below.

Data Collection

Figure 2:
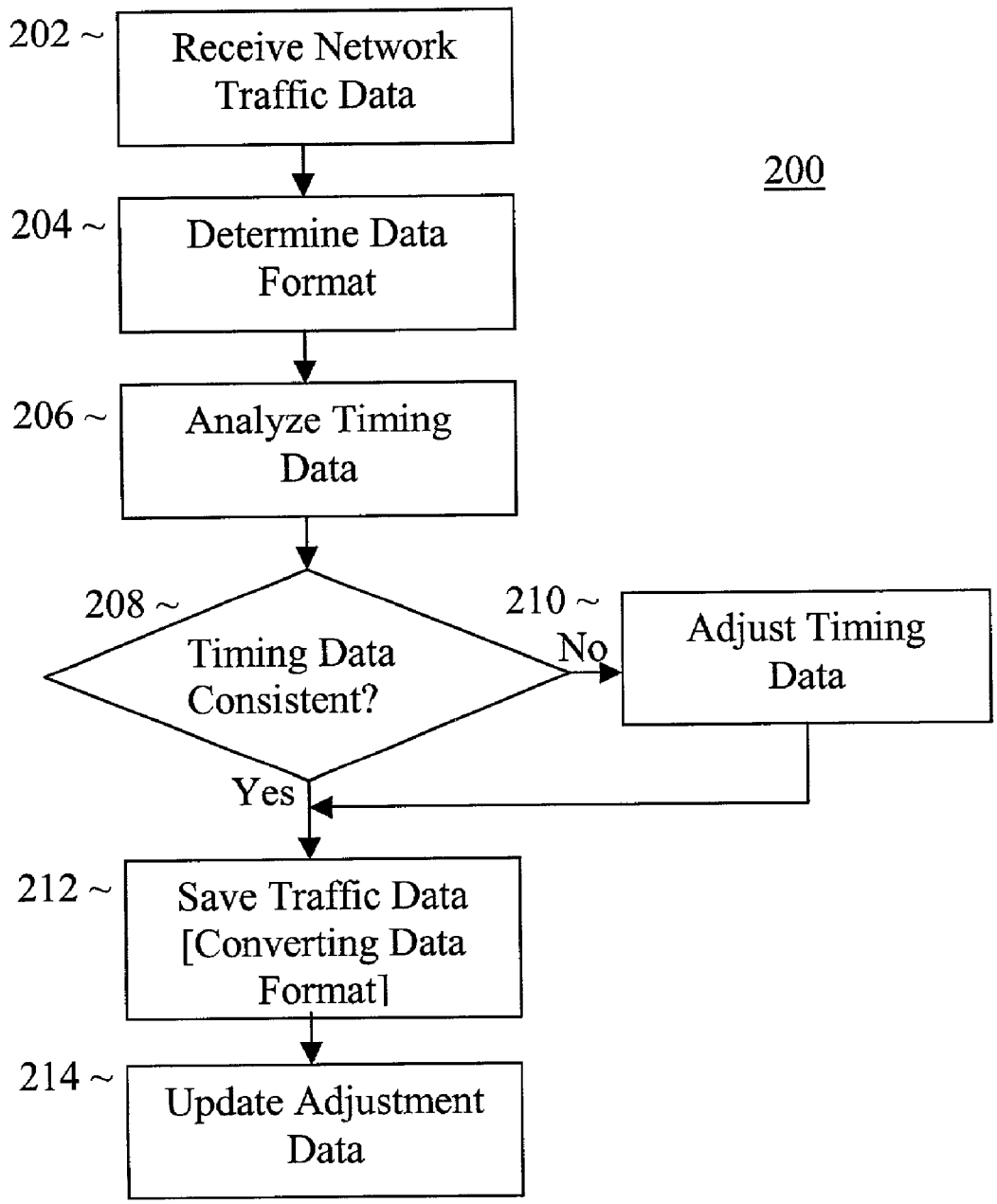
FIG. 2 illustrates a method view of the data collection aspect of the present invention, in accordance with one embodiment.

Referring now also to FIG. 2, a flow chart illustrating the operational flow of the relevant aspects of data collector 102, in accordance with one embodiment, is shown. As illustrated, at block 202, data collector 102 receives a "reporting" of descriptive data associated with certain network traffic of interest. The descriptive data may be provided by a routing device routing network traffic, a sensor sensing or monitoring network traffic being routed, or other devices of the like. The provision may be made as part of a periodic reporting that the routing or sensor device is configured to make periodically, or the provision may be made in response to an inquiry by data collector 102, or at the direction of a "director" device directing distributed network traffic management. One example of such "director" device is described in co-pending U.S. patent applications, Ser. No. 09/631,898, entitled "A Distributed Solution For Regulating Network Traffic", filed on Aug. 4, 2000, and Ser. No. 09/685,518, entitled "Progressive and Distributed Regulation of Selected Network Traffic Destined for a Network Node", filed on Oct. 9, 2000. These applications are hereby fully incorporated by reference.

For the illustrated embodiment, data collector 102 supports a plurality of formats under which the descriptive data may be reported. Accordingly, at block 204, data collector 102, upon receipt of the reported data, first determines the format of the descriptive data. It is assumed each support format may be uniquely determined. For example, each format may include an identifier or an identifying attribute disposed at certain position of the data. For the multi-format embodiment, if the data format is not discernable, the data is discarded, and an error is logged (not shown).

Upon determining the data format of the received data, data collector 102, among other things, proceeds to analyze the timing data. As alluded to earlier, a routing device's perception of time may be significantly different from that of its sensors. Additionally, for packet traffic being routed on a "best effort" basis over a network such as the Internet, from time to time, the timing data, i.e. the time elapsed from the time a packet is sent out of a source node to the time the packet arrives at a data node may become distorted. To further illustrate, when packet is sent from node A to node B, most of the times the timing data would reflect a 10+/−1 "timing ticks" as transmit time, however from time to time, unusually large timing values, like 50 or unusually small timing values, like 1, may be reported. In these cases, data collector 102 advantageously recognizes these unusually large or unusually small timing values as "aberrations", and automatically corrects them accordingly.

Thus, for the embodiment, at block 208, data collector 102 determines if the timing data of the reported data is "consistent" with the timing patterns of other routing devices and/or prior network traffic. Data collector 102 maintains profile records of the historic timing patterns. If data collector 102 determines that the timing data are not consistent with the timing patterns of other routing devices and/or prior network traffic, at block 210, data collector automatically adjusts the timing data to conform the timing data of the received network traffic to the timing patterns of the other routing devices and/or prior network traffic. The amount of modification to be applied to adjust the timing data to conform to the timing patterns of other routing devices and/or prior network traffic data is application dependent, and preferably configurable by an administrator with the proper authority.

At block 212, either upon determining that the timing data are consistent or the making of the adjustment, data collector 102 saves the descriptive data into the temporal and/or persistent storage 104–106. For the embodiment, data collector 212 also converts and saves the received data in a common format to facilitate more efficient operation for subsequent query processing. Further, at block 214, data collector 214 updates the adjustment data it employs to "auto correct" the timing data, based on the timing data of the received network traffic data.

In one embodiment, data collector 102 employs a pair of deviation thresholds +/−"delta" to determine whether the timing data of the received data are to be considered as aberrations or not. In one embodiment, "delta" is one standard deviation of the earlier timing data. In one embodiment, the adjustment to be applied in an "auto correct" situation is an adjustment value necessary to bring the timing data of the received data into alignment (e.g. within the earlier mentioned +/−"delta" threshold range) with a weighted running average of the timing data. In one embodiment, the weighting favors the historic data over the most recent data. That is, the weighting scheme implicitly gives more credence to earlier observed timing patterns then to the most recently observed timing behavior.

FIG. 3 illustrates the common data format for storing the network traffic data in temporal data buffer 104. As illustrated, the header values are stored in accordance with header format 302 (32 bytes for the embodiment), whereas the entry values are stored in accordance with entry format 304 (52 bytes for the embodiment). In alternate embodiments, other data formats may be practiced instead.

Similarly, FIG. 4 illustrates the common data format for storing the network traffic data in persistent data storage 106. As illustrated, the header values are stored in accordance with file header format 402 (16 bytes for the embodiment), whereas the entry values are stored in accordance with data header format 404 (28 bytes for the embodiment).

Management/Configuration

Figures 5A, 5B:
FIGS. 5a–5b illustrate two panes of an end user interface for configuring and managing the data collection and query facility of the present invention, in accordance with one embodiment.

Referring now to FIGS. 5a–5b, wherein two block diagrams illustrating two panes of end user interface 108 for use to manage or configure the data collection and query facilities of the present invention, in accordance with one embodiment, are shown. As alluded to earlier, these panes, panes 502 and 512 are made available to an administrator with proper authority. Enforcement or ensuring the administrator as one having the necessary authority, may be accomplished using anyone of a number of techniques known in the art, such as through the "log in" process of the "host" system.

As illustrated, pane 502 includes drop list 504 for presenting the configurable parameters, and field 506 for setting the parameter value of the selected parameter. In one embodiment, the parameters include, but are not limited to

| Name of Field | Type | Description | Default Value |
|---|---|---|---|
| BufferSize | Number | Temporal buffer size in bytes | 1M |
| RecvQueueSize | Number, or MAX | Kernel buffer size in bytes | MAX |
| UdpPorts | Numbers, space delimited | Which UDP ports to listen on for network traffic flow data | 2055 |
| TcpPorts | Numbers, space delimited | Which TCP ports to listen on for client connections | 2001 |
| Monitoring | ON or OFF | When OFF, incoming network traffic flow is dropped (rather than being added to the temporal buffer) | ON |
| Logging | ON or OFF | When ON, incoming network traffic flow is written into a system log file | OFF |
| Checksumming | ON or OFF | When ON, checksum is performed on input files. | ON |
| AllowedUdpSenders | Space delimited IP addrs, or ALL, or NONE | Which IP addresses may send network traffic flow data | ALL |
| AllowedTcpClients | Space delimited IP addrs, or ALL, or NONE | Which IP addresses may connect as clients | ALL |
| MaxLogFileSize | Number | After reaching this size in bytes, close the current log file and start a new one | 100M |
| RecycleLogFiles | ON or OFF | If ON, when disk fills up, replace oldest log file; if OFF, just stop logging | OFF |
| Flush Delay or LogFileFlushDelay | Number | Max seconds before logged data is flushed to disk | 5 |

Pane 512 is provided to facilitate an authorized administrator in performing various management operations, including state and/or status checking. Pane 512 includes in particular field 514 for entering the various management operation commands. In one embodiment, the management commands include, but are not limited to

| Command | Description |
|---|---|
| show buffersize | Show the size in bytes of the temporal data buffer |
| show datasize | Show the size in bytes of the data present in the temporal buffer |
| show file logging | Show whether file logging is enabled |
| show file recycling | Show whether file recycling is enabled |
| show monitoring | Show whether monitoring is enabled |
| show checksumming | Show whether checksumming is enabled |
| show ports | Show the UDP ports being listens for network traffic flow |
| show query version | Show the current version of the query language |
| show current time | Show the current time in UnixSecs |

| Command | Effect |
|---|---|
| set buffersize <number> | Set the size in bytes of the temporal data buffer |
| set maxlogfilesize <number> | Set the size in bytes of the maximum log file |
| start monitoring | Start monitoring network traffic flow |
| stop monitoring | Stop monitoring network traffic flow |
| start file logging | Start file logging |
| stop file logging | Stop file logging |
| start file recycling | Start file recycling |
| stop file recycling | Stop file recycling |
| set checksumming | Turn checksumming on or off |
| {ON/OFF} | |
| add port <number> | Add a UDP port to ports to be listen |
| remove port <number> | Remove a UDP port from ports to be listen |

| Command | Effect |
|---|---|
| save to <filename> | Save the data in the temporal buffer to specified file |
| load from <filename> | Load the data in the specified file into the temporal buffer |

Referring now to FIGS. 5c–5d, wherein two block diagrams illustrating two panes of end user interface 108 for use to run queries against a collection of network traffic data, in accordance with one embodiment, are shown. As illustrated, panes 522 and 532 include fields 524 and 534 for a user to submit "high level" (abstracted) queries that result in queries formed with language elements of the network oriented query language of the present invention or "advanced" queries expressed with the language elements.

As those skilled in the art would appreciate, panes 502–532 in practice typically include many more end user interface features, such as buttons and the like. These features are not illustrated, so not to obscure the present invention.

Query Generation

Figure 6A:
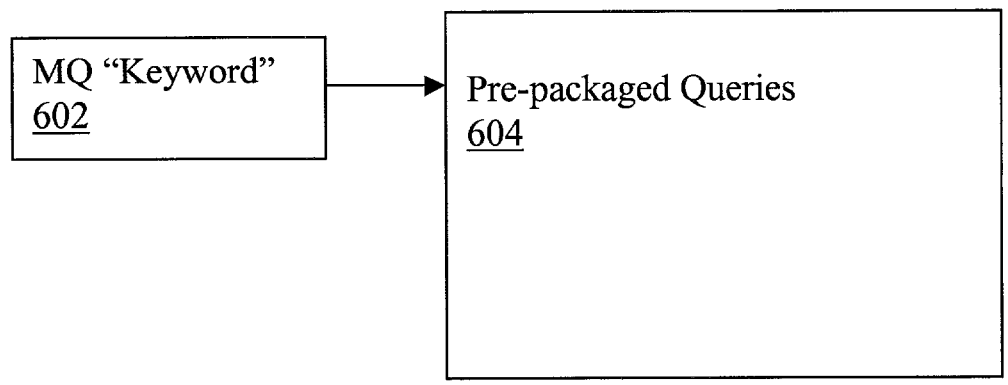
FIGS. 6a–6b illustrate the query command feature of the query facility of the present invention, in accordance with one embodiment.
Figure 6B:
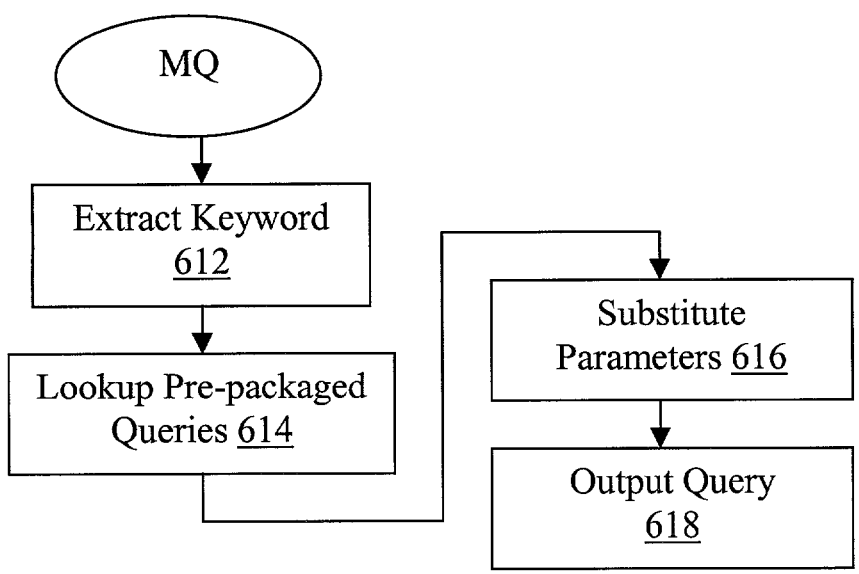

Referring now to FIGS. 6a–6b, wherein two block diagrams illustrating query generator 110 of FIG. 1 in further details, in accordance with one embodiment, are shown. As illustrated in FIG. 6a, query generator 110 includes library 604 of parameterized pre-packaged queries formed with language elements of the network oriented query language of the present invention, and logic 602 for looking up the parameterized pre-packaged queries based on "high level" (abstracted) query "commands".

As illustrated in FIG. 6b, upon invocation, at block 612, query generator 110 extracts the "keywords" from the "high level" (abstracted) query "command" entered. At block 614, query generator 110, using the extracted "keyword", looks up the corresponding pre-packaged query. At block 616, query generator 110 resolves the query parameters of the retrieved pre-packaged query, based on the "parameter values" submitted in conjunction with the "high level" (abstracted) query "command" entered. Upon processing the parameters, query generator 110, at block 618 outputs the pre-packaged query for compilation by query compiler 112, and eventual execution under the control of execution engine 114.

In one embodiment, the "high level" (abstracted) query "commands" and their corresponding queries include

| Query Command | Que |
|---|---|
| mq hist keys values conditions | mquery { DefHist 1 Keys = keys Values = values If DataPresent ForEachFlow { If conditions { AddToHist 1 } } PrintHist 1 } |
| mq top100 keys | mquery { |

-continued

| Query Command | Que |
|---|---|
| conditions | DefArray 1 keys<br>If DataPresent ForEachElow {<br>  If conditions {<br>    AddToArray 1<br>  }<br>}<br>command to print top100 output<br>} |
| mq hdrhist keys<br>values conditions | mquery {<br>  DefHist 1 Keys = keys Values = values<br>  If DataPresent ForEachPacket {<br>    If conditions {<br>      If (var255 == 0)<br>        var255 = BaseSeqNumber<br>      AddToHist 1<br>      Set var255 = BaseSeqNumber +<br>        NumEntriesinPacket<br>    }<br>  }<br>  PrintHist 1<br>} |

Listed above are just examples of some of the "high level" (abstracted) query commands that can be supported under the present invention. The meaning of the various language elements are either self-explanatory or will be readily apparent in view of the descriptions to follow. As those skilled in the art will appreciate, especially in view of the descriptions to follow, the present invention may be practiced with many more "high level" (abstracted) query commands (or less).

Network Oriented Query Language

In accordance with the presently preferred embodiment, the network oriented query language of the present invention includes the language elements, and syntax as set forth below:

| Language Element | Expansion |
|---|---|
| <MQuery> | mquery <CommandBlock> \|<br>mbinnedquery <CommandBlock> binsize \|<br>mbinnedquery <CommandBlock><br>binsize start stop<br>Binsize, start, and stop are in seconds;<br>Start and stop are in the UnixSecs domain<br>while binsize is an absolute number |
| <CommandBlock> | <Command> \|<br>{<CommandList> } |
| <CommandList> | <Command> \|<br><Command> <CommandList><br>Commands may be separated by newlines<br>or semicolons if you wish but it is<br>not required. |
| <Command> | <IfCommand> \|<br><SetCommand> \|<br><IncrCommand> \|<br><IncrByCommand> \|<br><DefHistCommand> \|<br><DefArrayCommand> \|<br><WithFirstPacketCommand> \|<br><WithLastPacketCommand> \|<br><ForEachPacketCommand> \|<br><ForEachFlowCommand> \|<br><AddToHistCommand> \|<br><AddToArrayCommand> \|<br><PrintCommand> \|<br><NewLineCommand> \|<br><PrintHistCommand> \|<br><PrintArrayCommand> \| |

-continued

| Language Element | Expansion |
|---|---|
| <IfCommand> | If <Expr> <CommandBlock> \|<br>If <Expr> <CommandBlock> Else<br><CommandBlock> |
| <SetCommand> | Set <Var> <Expr> \|<br>Set <Var> = <Expr> \|<br><Var> = <Expr> |
| <IncrCommand> | Incr <Var> \|<br><Var>++ |
| <IncrByCommand> | Incr <Var> By <Expr> \|<br><Var> += <Expr> |
| <DefHistCommand> | <DefHist> <Index> <KeyExpr> \|<br><DefHist> <Index> <KeyExpr><br><ValExpr> |
| <DefArrayCommand> | Define Array <Index> <Expr> \|<br>DefArray <Index> <Expr> |
| <WithFirstPacketCommand> | <WithFirstPacket> <CommandBlock> |
| <WithLastPacketCommand> | <WithLastPacket> <CommandBlock> |
| <ForEachPacketCommand> | <ForEachPacket> <CommandBlock> |
| <ForEachFlowCommand> | <ForEachFlow> <CommandBlock> |
| <AddToHistCommand> | Add to Histogram <Index> \|<br>Add to Hist <Index> \|<br>AddToHist <Index> \|<br>AddHist <Index> |
| <AddToArrayCommand> | Add To Array <Index> \|<br>AddToArray <Index> \|<br>AddArray <Index> |
| <PrintCommand> | Print "string" \|<br>Print_"string " \|<br>Print <Expr> \|<br>Print_<Expr> \|<br>Print <Lvar> |
| <NewLineCommand> | NewLine \|<br>NL |
| <PrintHistCommand> | Print Histogram <Index> \|<br>Print Hist <Index> \|<br>PrintHist <Index> |
| <PrintArrayCommand> | Print Array <Index> \|<br>PrintArray <Index> |
| <Expr> | CurrentTime \|<br>DataPresent \|<br>MulDiv32 <Expr>, <Expr>, <Expr>\|<br>MulDiv64 <Expr>, <Lvar>, <Lvar>\|<br>32-bit constant integer \|<br>network address in dotted quad format \|<br><Var> \|<br><HeaderValue> \|<br><EntryValue> \|<br><ExprLogical> \|<br><ExprBitwise> \|<br><ExprArithmetic> \|<br><PrintType>:<Expr> \|<br>(<Expr>) |
| <Var> | Var<Index> |
| <DefHist> | Define Histogram \|<br>Define Hist \|<br>DefHist |
| <Index> | A number from 0 to 255 |
| <KeyExpr> | Keys <ExprList> \|<br>Keys = <ExprList> \|<br>Key <ExprList> \|<br>Key = <ExprList> \|<br>Bins <ExprList> \|<br>Bins = <ExprList> \|<br>Bin <ExprList> \|<br>Bin = <ExprList> |
| <ValExpr> | Values = <ValueList> |
| <WithFirstPacket> | With First Packet \|<br>WithFirst Packet \|<br>WithFirstPacket \|<br>For First Packet \|<br>ForFirst Packets \|<br>ForFirstPacket |
| <WithLastPacket> | With Last Packet \|<br>WithLast Packet \|<br>WithLastPacket \|<br>For Last Packet \|<br>ForLast Packet \| |

-continued

| Language Element | Expansion |
| --- | --- |
| | ForLastPacket |
| <ForEachPacket> | For Each Packet \| |
| | ForEach Packet \| |
| | ForEachPacket |
| <ForEachFlow> | For Each Flow \| |
| | ForEach Flow \| |
| | ForEachFlow |
| <Lvar> | LVar<Index> |
| <HeaderValue> | OrigFlowType \| |
| | NumEntriesInPacket \| |
| | RouterUptime \| |
| | UnixSecs \| |
| | SensorUnixSecs \| |
| | BaseSequenceNumber \| |
| | EngineType \| |
| | EngineId \| |
| | UnixMSecs \| |
| | AggregationMethod \| |
| | AggregationVersion \| |
| | SamplingInterval \| |
| | SenderAddr |
| <EntryValue> | SourceAddr \| |
| | DestAddr \| |
| | NextHop \| |
| | InInterface \| |
| | OutInterface \| |
| | NumPackets \| |
| | NumBytes \| |
| | FlowStartTime \| |
| | FlowEndTime \| |
| | SourcePort \| |
| | DestPort \| |
| | PAD8 \| |
| | TcpFlags \| |
| | Protocol \| |
| | TOS \| |
| | SourceAS \| |
| | DestAS \| |
| | SourceNetmask \| |
| | DestNetmask \| |
| | PAD16 \| |
| | NumFlows |
| <ExprLogical> | ! <Expr> \| |
| | <Expr> && <Expr> \| |
| | <Expr> \|\| <Expr> \| |
| | <Expr> <> Expr> \| |
| | <Expr> != <Expr> \| |
| | <Expr> == <Expr> \| |
| | <Expr> = <Expr> \| |
| | <Expr> <= <Expr> \| |
| | <Expr> < <Expr> \| |
| | <Expr> >= <Expr> \| |
| | <Expr> > <Expr> |
| <ExprBitwise> | ~ <Expr> \| |
| | <Expr> & <Expr> \| |
| | <Expr> AND <Expr> \| |
| | <Expr> \| <Expr> \| |
| | <Expr> OR <Expr> \| |
| | <Expr> ^ <Expr> \| |
| | <Expr> EOR <Expr> \| |
| | <Expr> XOR <Expr> |
| <ExprArithmetic> | <Expr> + <Expr> \| |
| | <Expr> − <Expr> \| |
| | <Expr> * <Expr> \| |
| | <Expr> / <Expr> \| |
| | <Expr> % <Expr> \| |
| | <Expr> # <Expr> \| |
| <ExprList> | <Expr> \| |
| | { <Expr> <Expr> . . . <Expr> } |
| | Multiple exprs in a list should be space-delimited |
| <ValueList> | <Value> \| |
| | {<Value> <Value> . . . <Value> } |
| | Multiple values in a list should be space-delimited |
| <Value> | Sum:<Expr> \| |
| | Or:<Expr> \| |

-continued

| Language Element | Expansion |
| --- | --- |
| | Min:<Expr> \| |
| | Max:<Expr> \| |
| | First:<Expr> \| |
| | Last:<Expr> \| |
| | Unique:<Expr> |
| <PrintType> | UInt: \| |
| | Int: \| |
| | CUInt: \| |
| | CInt: \| |
| | Secs: \| |
| | MSecs: \| |
| | TcpFlags: \| |
| | Protocol: \| |
| | IPAddr: \| |
| | Bits: \| |
| | Hex: |

The above example language elements support the singular execution of a query (mquery), and repeated execution of a query over a plurality of time bins (mbinnedquery). A time bin is synonymous with a time period. An example of a time bin is the time period from time unit 9:01 to 9:02. An example of a timing bin specification is (900, 1000, 10), which is interpreted to mean that the first time bin is to start at "time tick" 900, and the last time bin is to stop at "time tick" 1000, with each time bin having a bin size of 10 "time ticks". Accordingly, the example time bin specification results in 10 time bins (over which the query is to be run).

The above example language elements assume two types of working data structures for returning the result of the query, a histogram data structure and an array data structure. The two data structures are created using the command element "Define Histogram" (also specifiable as Define Hist or DefHist), and "Define Array" (also specifiable as DefArray).

The query results are added to the histogram or array data structures through the corresponding "Add to" language elements. The query results are selected using the remaining language elements, which are substantially self-explanatory to those skilled in art. In particular, those skilled in the art will appreciate that inclusion of network oriented language elements such as the various versions of "With First Packet", "With Last Packet", "For First Packet", "For Last Packet", "For Each Packet", and the various predetermined network oriented "header value" and "entry value" keywords, renders the query language especially efficient in articulating interrogatories against a collection of network traffic data. Those skilled in the art will also appreciate that the present invention may be practiced with more or less language elements.

Query Compilation

Figure 7:
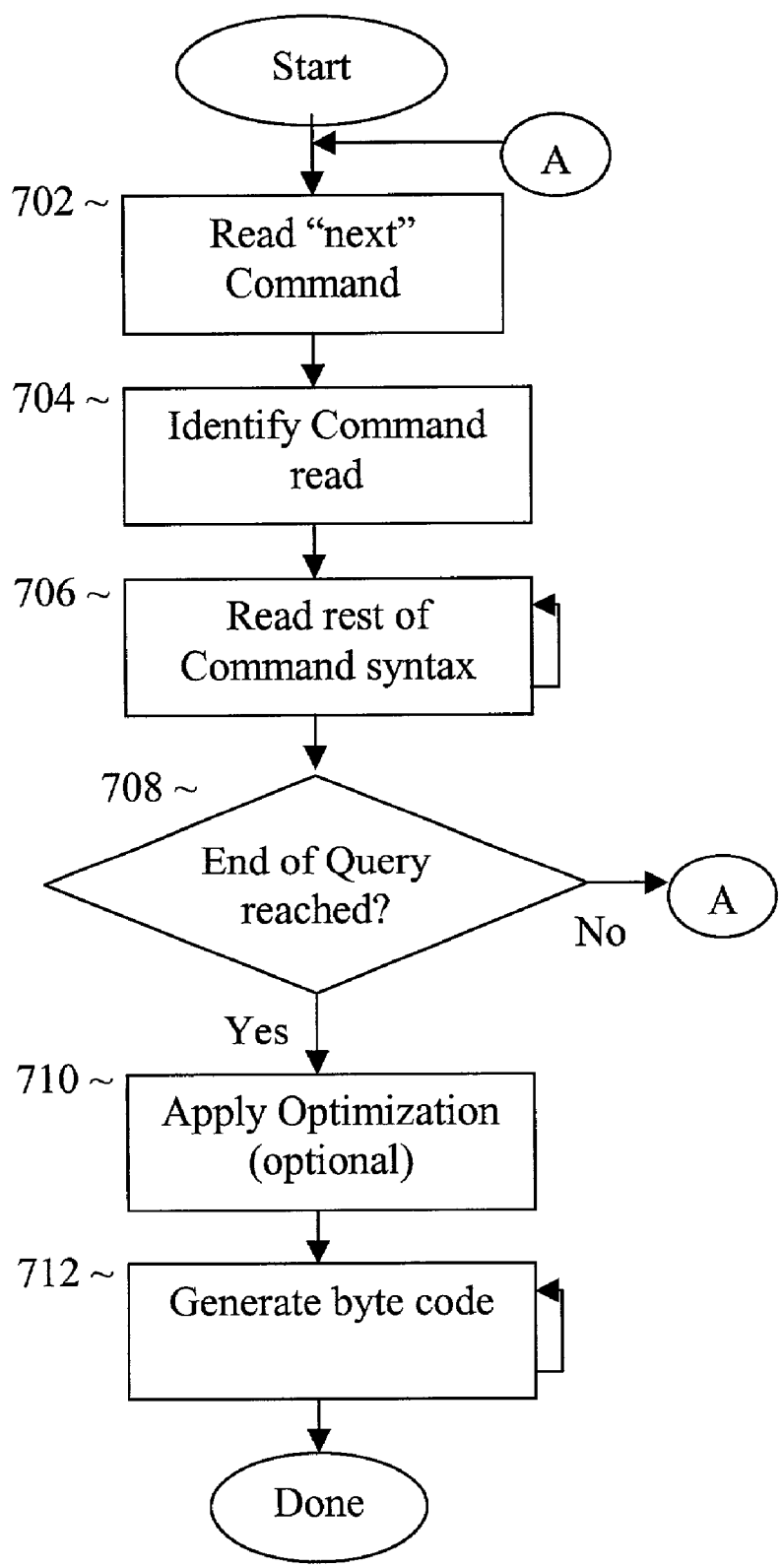
FIG. 7 illustrates the operational flow of the relevant aspects of the query compiler of FIG. 1, in accordance with one embodiment.

Referring now to FIG. 7, wherein a flow chart illustrating the operational flow of the relevant aspects of query compiler 112, in accordance with one embodiment, is shown. As illustrated, upon invocation, at block 702, query compiler 112 locates the "next" command of the query being compiled. Locating the "next " command of the query being compiled may be effectuated using any one of a number of "parsing" techniques known in the art. Upon locating the "next" command of the query being compiled, at block 704, query compiler 114 identifies the command read (e.g. from a language dictionary maintained by query compiler 112).

Next, at block 706, query compiler 114 reads the rest of the command syntax, and determines the semantic for the identified command.

Then, at block 708, query compiler 114 determines if end of query has been reached. If not, query compiler 114 returns to block 702, and continues the compilation process from there. Eventually, the end of query being compiled is reached. At such time, query compiler 114 may optionally apply one or more optimizations to the commands analyzed, block 710. The optimizations may be any one or more of the applicable compiler optimization techniques known in the art.

Finally, with or without optimizing the commands analyzed, at block 712, query compiler 114 generates byte codes for the commands analyzed. FIGS. 10a–10e illustrate one example implementation of the byte code generation part of query compiler 114. In alternate embodiments, other equivalent "code generation" approaches may be practiced instead. In one embodiment, query compiler 114 includes the size of the byte code generated for the query in the beginning of the executable byte codes.

Query Execution

Figure 8:
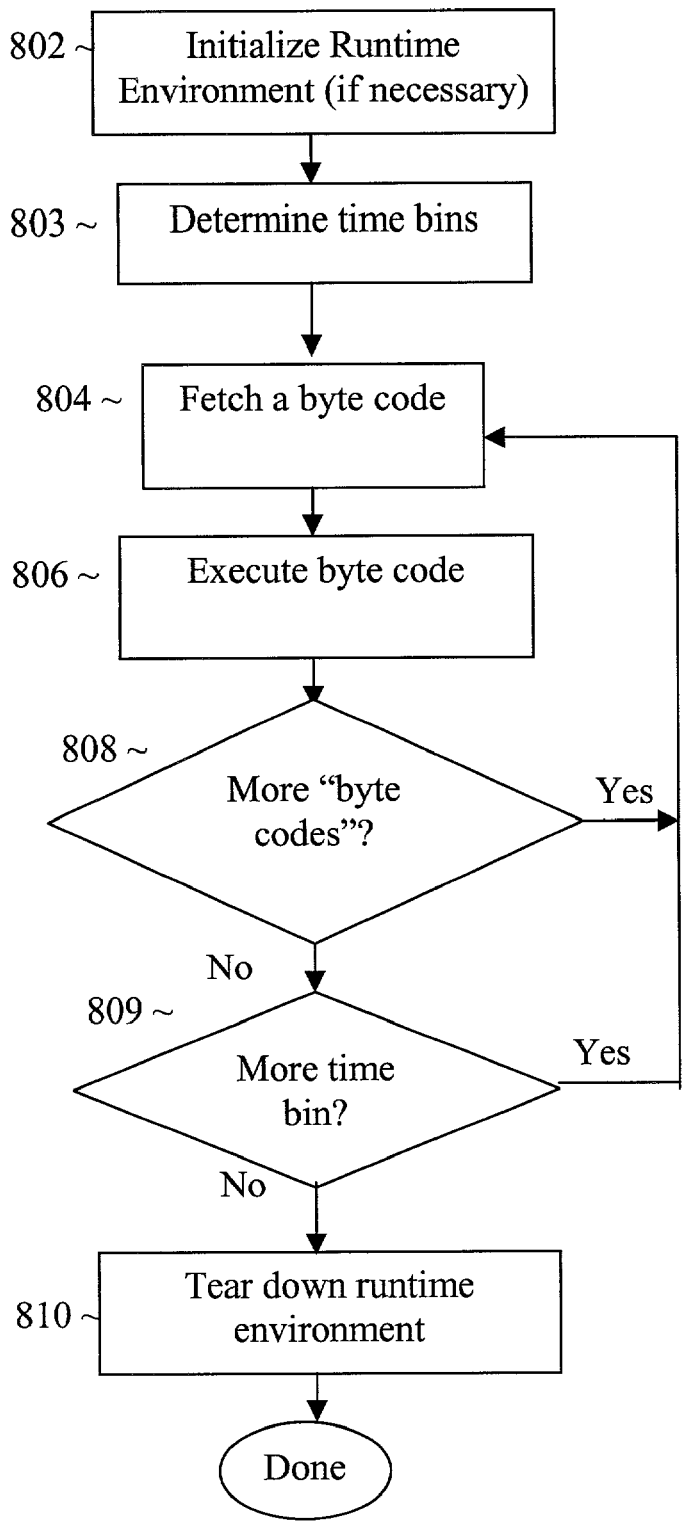
FIG. 8 illustrates the operational flow of the relevant aspects of the query execution engine of FIG. 1, in accordance with one embodiment.

Referring now to FIG. 8, wherein a flow chart illustrating the operational flow of the relevant aspects of query execution engine 114 in accordance with one embodiment, is shown. As illustrated, upon invocation, if necessary (e.g. when invoked the first time), query execution engine 114 initializes the runtime environment for query execution, block 802. Initialization tasks include but are not limited to obtaining and initializing a memory pool allocation, loading an exception handler, and so forth.

Upon setting up the runtime environment, query execution engine 114 determines if the query to be executed is a binned query, block 803. If so, query execution engine 114 further determines the time bin structure, i.e. the time bins over which the query is to be executed.

Thereafter, query execution engine 114 successively fetches and dispatches the "byte codes" of the query to be executed, blocks 804–808. As each "byte code" is executed, query execution engine 114 repeats the process, until eventually all generated "byte codes" of a query has been executed, for each and every applicable time bin. Execution of each byte code is dependent on the semantic of the corresponding command or commands, similar to other "byte code" based execution known in the art. These corresponding portions may be implemented in any one of a number of implementation approaches of these like kind "byte code" based execution facilities known in the art.

In one embodiment, as part of controlling the execution, query execution engine 114 automatically "apportions" the selected data between two time bins, when the selected data straddles two time bins and the query is a binned query. Query execution engine 114 analyzes the amount of "straddling" in each of the neighboring time bins, and proportionally apportions the data accordingly. In alternate embodiment, disproportionate or weighted apportionment may also be supported.

In one embodiment, as part of controlling the execution, query execution engine 114 also automatically amplifies the selected data, if the selected data were collected by the reporting/monitored device on a sampling basis. For the illustrated embodiment, query execution engine 114 also analyzes the data to determine the sampling ratio, and amplifies accordingly. For example, in querying for packet count during a time period, upon determining that the packet count data were collected on a "1 of 10" sampling method, query execution engine 114 automatically amplifies the packet count data by 10×. In alternate embodiments, non-corresponding, i.e. amplification that is larger or smaller the sampling ratio, may also be supported.

At the end of execution, for the illustrated embodiment, query execution engine 114 "tears down" the execution environment, block 810. In alternate embodiments, fully or partially persistent runtime environment for different queries may be practiced instead.

Example Host Computer System

Figure 9:
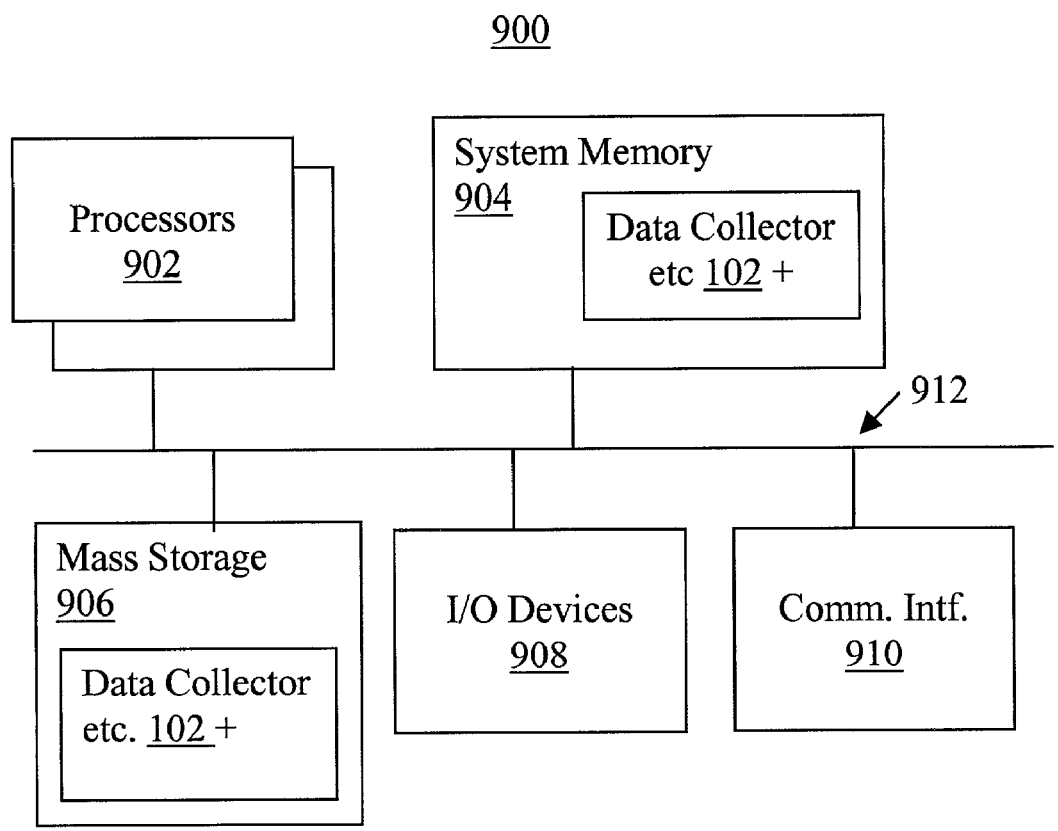
FIG. 9 illustrates an example computer system suitable for use to host a software implementation of the data collection and query facilities of the present invention, in accordance with one embodiment.

FIG. 9 illustrates an example computer system suitable for use to be programmed with the data collection and query facilities 101 and 103 of the present invention, in accordance with one embodiment. As shown, computer system 900 includes one or more processors 902 (typically depending on whether it is used as host to sensor or the director), and system memory 904. Additionally, computer system 900 includes mass storage devices 906 (such as diskette, hard drive, CDROM and so forth), input/output devices 908 (such as keyboard, cursor control and so forth) and communication interfaces 910 (such as network interface cards, modems and so forth). The elements are coupled to each other via system bus 912, which represents one or more buses. In the case of multiple buses, they are bridged by one or more bus bridges (not shown). Each of these elements performs its conventional functions known in the art. In particular, system memory 904 and mass storage 906 are employed to store a working copy and a permanent copy of the programming instructions implementing the data collection and query facility of the present invention. The permanent copy of the programming instructions may be loaded into mass storage 906 in the factory, or in the field, as described earlier, through a distribution medium (not shown) or through communication interface 910 (from a distribution server (not shown). The constitution of these elements 902–912 are known, and accordingly will not be further described.

CONCLUSION AND EPILOGUE

Thus, it can be seen from the above descriptions, a novel method and apparatus for collecting network traffic data and querying the collected data has been described. The novel scheme is particularly useful in detecting misuse of network links, e.g. a denial of service attack.

While the present invention has been described referencing the illustrated and above enumerated embodiments, the present invention is not limited to these described embodiments. Numerous modification and alterations may be made, consistent with the scope of the present invention as set forth in the claims to follow. Thus, the above described embodiments are merely illustrative, and not restrictive on the present invention.

What is claimed is:

1. A networking method comprising:
   receiving descriptive data of networking traffic including timing data of the network traffic;
   analyzing said timing data of the network traffic to determine whether the timing data are to be considered as an aberration; and
   modifying the timing data if the timing data are to be considered as an aberration.

2. The method of claim 1, wherein said descriptive data of network traffic are network traffic flow oriented.

3. The method of claim 1, wherein said analyzing comprises comparing said timing data to timing patterns of previously received network traffic.

4. The method of claim 1, wherein said modifying comprises modifying said timing data to conform to timing patterns of earlier network traffic for which descriptive data were received.

5. The method of claim 4, wherein said method further comprises updating said timing patterns of earlier network traffic with said time data of the network traffic for which descriptive data were received.

6. The method of claim 5, wherein said updating of the timing patterns of earlier network traffic comprises weighing timing data of network traffic in a manner that biases towards the timing data of earlier network traffic over timing data of later network traffic.

7. An apparatus comprises:
storage medium having stored therein a plurality of programming instructions designed to implement a network traffic data collection function, when executed, enables the apparatus to
receive descriptive data of networking traffic including timing data of the network traffic,
analyze said timing data of the network traffic to determine whether the timing data are to be considered as an aberration, and
modify the timing data if the timing data are considered as an aberration; and
one or more processors coupled to the storage medium to execute the programming instructions.

8. The apparatus of claim 7, wherein said descriptive data of network traffic are network traffic flow oriented.

9. The apparatus of claim 7, wherein said network traffic collection function, when executed, enables said apparatus to perform said analyzing by comparing said timing data to timing patterns of previously received network traffic.

10. The apparatus of claim 7, wherein said network traffic collection function, when executed, enables said apparatus to perform said modifying by modifying said timing data to conform to timing patterns of earlier network traffic for which descriptive data were received.

11. The apparatus of claim 10, wherein said network traffic collection function, when executed, further enables said apparatus to update said timing patterns of earlier network traffic with said time data of the network traffic for which descriptive data was received.

12. The apparatus of claim 11, wherein said network traffic collection function, when executed, enables said apparatus to perform said updating of the timing patterns of earlier network traffic by weighing timing data of network traffic in a manner that biases towards the timing data of earlier network traffic over timing data of later network traffic.

13. A method comprising:
receiving a query to be run against a collection of network traffic data;
determining whether the query is to be run for a plurality of time bins of the network traffic data;
determining said time bins if the query is to be run for a plurality of time bins; and
causing said query to be repeatedly run against said collection of network traffic data for said time bins.

14. The method of claim 13, wherein said query comprises specifications for a start time for a first of said time bins, a number of time bins, and a stop time for a last of said time bins; and said first and second determining as well as said causing are performed in accordance with said specifications.

15. The method of claim 14, wherein said number of time bins is explicitly specified.

16. The method of claim 14, wherein said number of time bins is implicitly specified through a specification of a time bin size, specified in conjunction with said start time of the first time bin, and said stop time of the last time.

17. The method of claim 13, wherein each of said repeated running of said query against said collection of network traffic data comprises automatically apportioning network traffic data between two time bins when the network traffic with which the network traffic data are associated straddles over the two time bins.

18. An apparatus comprising
storage medium having stored therein executable instructions designed to implement a network traffic data query facility, when executed, enables the apparatus to
receive a query to be run against a collection of network traffic data,
determine whether the query is to be run for a plurality of time bins of said network traffic data,
determine said time bins if the query is to be run for a plurality of time bins, and
cause said query to be repeatedly run against said collection of network traffic data for said time bins; and
one or more processors coupled to the storage medium to execute the instructions.

19. The apparatus of claim 18, wherein said query comprises specifications for a start time for a first of said time bins, a number of time bins, and a stop time for a last of said time bins; and said network traffic query facility, when executed, enables said apparatus to perform said first and second determining as well as said causing said query to be repeatedly run in accordance with said specifications.

20. The apparatus of claim 19, wherein said number of time bins is explicitly specified.

21. The apparatus of claim 19, wherein said number of time bins is implicitly specified through a specification of a time bin size, specified in conjunction with said start time of the first time bin, and said stop time of the last time.

22. The apparatus of claim 18, wherein said network traffic query facility, when executed, further enables the apparatus to automatically apportion network traffic data between two time bins when the network traffic with which the network traffic data are associated straddles over the two time bins, when running said query against said collection of network traffic data for one of said time bins.

23. A method comprising:
retrieving a record of network traffic data to be processed as part of an execution of a query against a collection of network traffic data comprising said record of network traffic data;
determining whether said record of network traffic data was created by its originating network trafficking device under a sampling mode;
determining a sampling ratio under which said record of network traffic data was created if said record of network traffic data was created by its originating network trafficking device under a sampling mode; and
amplifying one or more data elements of said retrieved record of network traffic data in accordance with said determined sampling ratio.

24. The method of claim 23, wherein said retrieved record of network traffic data comprises specifications for whether the record of network traffic data was created by its originating network trafficking device under a sampling mode, and if so, the sampling ratio; and said first and second determining are performed by analyzing said retrieved record of network traffic data.

25. An apparatus comprising
   storage medium having stored therein executable instructions designed to implement a network traffic query facility, when executed, enables the apparatus to
      retrieve a record of network traffic data to be processed as part of an execution of a query against a collection of network traffic data comprising said record of network traffic data,
      determine whether said record of network traffic data was created by its originating network trafficking device under a sampling mode,
      determine a sampling ratio under which said record of network traffic data was created if said record of network traffic data was created by its originating network trafficking device under a sampling mode, and
      amplify one or more data elements of said retrieved record of network traffic data in accordance with said determined sampling ratio; and
   one or more processors coupled to the storage medium to execute the instructions.

26. The apparatus of claim 25, wherein said retrieved record of network traffic data comprises specifications for whether the record of network traffic data was created by its originating network trafficking device under a sampling mode, and if so, the sampling ratio; and said network traffic data query facility, when executed, further enables the apparatus to perform said first and second determining by analyzing said retrieved record of network traffic data.

27. A method comprising:
   receiving a query to be run against a collection of network traffic data;
   determining if the query comprises a network traffic flow oriented command that specifies one or more processing to be performed for one or more network traffic flows;
   determining said one or more processing to be performed for said one or more network traffic flows;
   generating first byte codes for said one or more processing to be performed for said one or more network traffic flows; and
   generating second byte codes to repeat execution of said first byte codes generated for said one or more processing for said one or more network traffic flows.

28. The method of claim 27, wherein said network traffic flow oriented command specifies said one or more processing are to be performed for each of said one or more network traffic flows; and said second generating comprises generating said second byte codes which repeat execution of said first byte codes generated for said one or more processing for each of said one or more network traffic flows.

29. An apparatus comprising
   storage medium having stored therein executable instructions designed to implement a network traffic data query facility, when executed, enables the apparatus to
      receive a query to be run against a collection of network traffic data,
      determine if the query comprises a network traffic flow oriented command that specifies one or more processing to be performed for one or more network traffic flows,
      determine said one or more processing to be performed for one or more network traffic flows,
      generate first byte codes for said one or more processing to be performed for one or more network traffic flows, and
      generate second byte codes to repeat execution of said first byte codes generated for said one or more processing for one or more network traffic flows; and
   one or more processors coupled to the storage medium to execute the instructions.

30. The apparatus of claim 29, wherein said network traffic flow oriented command specifies said one or more processing are to be performed for each of said one or more network traffic flows; and network traffic query facility, when executed, enables said apparatus to generate said second byte codes which repeat execution of said first byte codes generated for said one or more processing for each of said one or more network traffic flows, when performing said second generating.

31. A method comprising:
   receiving a query to be run against a collection of network traffic data;
   determining if the query comprises a network traffic packet oriented command that specifies one or more processing to be performed for one or more network traffic packets;
   determining said one or more processing to be performed for said one or more network traffic packets;
   generating first byte codes for said one or more processing to be performed for said one or more network traffic packets; and
   generating second byte codes to repeat execution of said first byte codes generated for said one or more processing for said one or more network traffic packets.

32. The method of claim 31, wherein said network traffic packet oriented command specifies said one or more processing are to be performed for a selected one of a first, a last and each of said one or more network traffic packets; and said second generating comprises a selected one of generating said second byte codes that execute said first byte codes generated for said one more processor for a selected one of a first and a last of network traffic packets, and generating said second byte codes that repeat execution of said first byte codes generated for said one or more processing for each of said one or more network traffic packets.

33. An apparatus comprising
   storage medium having stored therein executable instructions designed to implement a network traffic data query facility, when executed, enables the apparatus to
      receive a query to be run against a collection of network traffic data,
      determine whether the query comprises a network traffic packet oriented command that specifies one or more processing to be performed for one or more network traffic packets,
      determine said one or more processing to be performed for said one or more network traffic packets,
      generate first byte codes for said one or more processing to be performed for said one or more network traffic packets, and
      generate second byte codes to repeat execution of said first byte codes generated for said one or more processing for said one or more network traffic packets; and
   one or more processors coupled to the storage medium to execute the instructions.

34. The apparatus of claim 33, wherein said network traffic packet oriented command specifies said one or more processing are to be performed for a selected one of a first, a last and each of said one or more network traffic packets; and said second generating comprises a selected one of generating said second byte codes that execute said first byte codes generated for said one more processor for a selected one of a first and a last of network traffic packets, and generating said second byte codes to repeat execution of said executable instructions generated for said one or more processing for each of said one or more network traffic packets.

35. A method comprising:
receiving a query to be run against a collection of network traffic data;
determining whether the query comprises a command;
determining whether the command comprises an expression;
determining whether the expression comprises one or more pre-determined network traffic attribute keywords; and
generating byte codes for said query, including byte codes for said command using said determined one or more pre-determined network traffic attribute keywords of said expression of said command.

36. The method of claim 35, wherein said one or more pre-determined network traffic attribute keywords comprise at least a selected one of a source address keyword, a destination address keyword, a next hop keyword, an ingress interface keyword, an egress interface keyword, a number of packets keyword, a number of byte keyword, a flow start time keyword, a flow end time keyword, a source port keyword, a destination port keyword, a TCP flag keyword, a protocol keyword, a type of service keyword, a source autonomous system keyword, a destination autonomous keyword, a source network address mask keyword, a destination network address mask keyword, and a number of network traffic flow keyword.

37. The method of claim 35, wherein said one or more pre-determined network traffic attribute keywords comprise at least a selected one of an original flow type keyword, a number of entries in a packet keyword, a router uptime keyword, a time keyword, an aggregation method keyword, an aggregation version keyword, a sampling interval keyword, and a sender address keyword.

38. An apparatus comprising
storage medium having stored therein executable instructions designed to implement a network traffic data query facility, when executed, enables the apparatus to
receive a query to be run against a collection of network traffic data;
determine whether the query comprises a command;
determine whether the command comprises an expression;
determine whether the expression comprises one or more pre-determined network traffic attribute keywords, and
generate byte codes for said query, including byte codes for said command using said determined one or more pre-determined network traffic attribute keywords of said expression of said command; and
one or more processors coupled to the storage medium to execute the instructions.

39. The apparatus of claim 38, wherein said one or more pre-determined network traffic attribute keywords comprise at least a selected one of a source address keyword, a destination address keyword, a next hop keyword, an ingress interface keyword, an egress interface keyword, a number of packets keyword, a number of byte keyword, a flow start time keyword, a flow end time keyword, a source port keyword, a destination port keyword, a TCP flag keyword, a protocol keyword, a type of service keyword, a source autonomous system keyword, a destination autonomous keyword, a source network address mask keyword, a destination network address mask keyword, and a number of network traffic flow keyword.

40. The apparatus of claim 38, wherein said one or more predetermined network traffic attribute keywords comprise at least a selected one of an original flow type keyword, a number of entries in a packet keyword, a router uptime keyword, a time keyword, an aggregation method keyword, an aggregation version keyword, a sampling interval keyword, and a sender address keyword.

* * * * *